United States Patent
Kuo

(10) Patent No.: US 12,428,159 B1
(45) Date of Patent: Sep. 30, 2025

(54) DOUBLE-DECK PASSENGER VEHICLE

(71) Applicant: Ming C Kuo, Cerritos, CA (US)

(72) Inventor: Ming C Kuo, Cerritos, CA (US)

( * ) Notice: Subject to any disclaimer, the term of this patent is extended or adjusted under 35 U.S.C. 154(b) by 0 days.

(21) Appl. No.: 19/173,216

(22) Filed: Apr. 8, 2025

(51) Int. Cl.
*B60N 2/01* (2006.01)
*B60N 2/24* (2006.01)
*B60N 2/34* (2006.01)
*B64D 11/06* (2006.01)

(52) U.S. Cl.
CPC ............ *B64D 11/0601* (2014.12); *B60N 2/01* (2013.01); *B60N 2/242* (2013.01); *B60N 2/34* (2013.01); *B64D 11/0602* (2014.12); *B64D 11/0641* (2014.12)

(58) Field of Classification Search
CPC ........ B60N 2/01; B60N 2/005; B60N 2/0292; B60N 2/34; B60N 2/45; B60N 2/995; B60N 2/12; B60N 2/2209; B60N 2/233; B60N 3/06; B60N 3/063; B64D 2011/0069; B64D 2011/0076; B64D 11/003; B64D 11/06; B64D 11/0601; B64D 11/0602; B64D 11/0604; B64D 11/0605; B64D 11/0638; B64D 11/0636; B64D 11/0641; B64D 11/0643; B64D 11/0015; B64D 2211/00; B60R 3/00; B60R 3/007; B61D 23/02; E06C 1/387
See application file for complete search history.

(56) References Cited

U.S. PATENT DOCUMENTS

| | | | | |
|---|---|---|---|---|
| 3,910,626 A | * | 10/1975 | Hobbensiefken | ........ B60N 2/34 297/118 |
| 6,183,032 B1 | * | 2/2001 | Champ | .................. B60N 2/206 297/336 |
| 6,352,309 B1 | * | 3/2002 | Beroth | ................. B64C 11/064 297/284.11 |
| 6,439,636 B1 | * | 8/2002 | Kuo | .................... B60N 2/02246 296/65.09 |
| 10,246,192 B1 | * | 4/2019 | Prasad | ..................... B60N 2/20 |
| 11,198,378 B1 | * | 12/2021 | Kuo | .................... B64D 11/0643 |
| 2004/0035980 A1 | * | 2/2004 | McDonnell | .............. B60N 2/34 244/118.6 |
| 2005/0104431 A1 | * | 5/2005 | Saberan | ................. B60N 2/206 297/331 |
| 2008/0018155 A1 | * | 1/2008 | Smiley | ..................... B60N 2/24 297/341 |
| 2008/0073960 A1 | * | 3/2008 | Nakaya | ................. B60N 2/305 297/341 |
| 2008/0100112 A1 | * | 5/2008 | Hausler | ............... B60N 2/2209 297/331 |

(Continued)

*Primary Examiner* — Gregory A Blankenship

(57) ABSTRACT

A conventional passenger vehicle has a lower deck and an upper deck on both sides of its aisle to double seating areas. Each deck has a ceiling and seat heights about the same as in sedans, hence minimizes the increase of vehicle height. Both decks are divided into seating sections with partition walls, and in a seating section each deck contains only a row of reclining seats. A ladder equips on each upper seating cell. Each seat has a footrest mounted separately on the partition wall in front of the seat for sitting comfort and forming a bed with the seat. The footrest can place at a higher elevation to use as a table and placed in a vertical storage position, providing more leg room for the seat. Some seating sections on the lower deck may mount two rows of non-reclinable seats to increase the vehicle capacity.

13 Claims, 8 Drawing Sheets

(56) References Cited

U.S. PATENT DOCUMENTS

| | | | | |
|---|---|---|---|---|
| 2009/0066121 | A1* | 3/2009 | Jacob | A47C 15/00 297/118 |
| 2009/0146005 | A1* | 6/2009 | Bettell | B64D 11/0643 244/118.6 |
| 2009/0243358 | A1* | 10/2009 | Henshaw | B64D 11/0601 297/340 |
| 2009/0302158 | A1* | 12/2009 | Darbyshire | B64D 11/0646 244/118.6 |
| 2011/0233333 | A1* | 9/2011 | Papke | B64D 11/00 244/118.6 |
| 2012/0104165 | A1* | 5/2012 | Dobrusin | B64D 11/0606 244/118.6 |
| 2012/0298798 | A1* | 11/2012 | Henshaw | B64D 11/06 244/118.6 |
| 2012/0318918 | A1* | 12/2012 | Johnson | B64D 11/0604 5/2.1 |
| 2012/0320508 | A1* | 12/2012 | Riedel | B64D 11/00153 361/679.01 |
| 2013/0241247 | A1* | 9/2013 | Wallace | B64D 11/0604 297/118 |
| 2014/0265501 | A1* | 9/2014 | Line | B60N 2/02 297/340 |
| 2015/0108813 | A1* | 4/2015 | Muller | B60N 2/235 297/362.11 |
| 2015/0251049 | A1* | 9/2015 | Kolvenbach | A63B 21/4033 482/146 |
| 2015/0274298 | A1* | 10/2015 | Kircher | B64D 11/0604 244/118.6 |
| 2015/0306978 | A1* | 10/2015 | Watanabe | B60N 2/6009 297/452.48 |
| 2016/0032562 | A1* | 2/2016 | Aoyama | B60R 3/00 180/68.3 |
| 2016/0144963 | A1* | 5/2016 | Gregoire | B64D 11/0601 244/118.6 |
| 2016/0194084 | A1* | 7/2016 | Rajasingham | B64D 11/0601 92/15 |
| 2016/0257313 | A1* | 9/2016 | Yin | B60N 2/995 |
| 2016/0288684 | A1* | 10/2016 | Christiansson | B60N 3/001 |
| 2016/0325838 | A1* | 11/2016 | Erhel | B60N 2/34 |
| 2017/0264218 | A1* | 9/2017 | Odoriba | G01S 17/08 |
| 2017/0362895 | A1* | 12/2017 | Simula | E06C 7/182 |
| 2018/0281964 | A1* | 10/2018 | Carlioz | B64D 11/0604 |
| 2018/0319502 | A1* | 11/2018 | Maclay | B64D 11/00 |
| 2019/0135136 | A1* | 5/2019 | Akaike | B60N 2/32 |
| 2019/0308733 | A1* | 10/2019 | O'Neill | B60N 2/995 |
| 2020/0130846 | A1* | 4/2020 | Mayne | B64D 11/0604 |
| 2020/0184242 | A1* | 6/2020 | Behr | H04N 23/54 |
| 2020/0247545 | A1* | 8/2020 | Vollers | B64D 11/0601 |
| 2020/0369387 | A1* | 11/2020 | Yaghoubi | B64D 11/0604 |
| 2021/0001989 | A1* | 1/2021 | Grafmüller | B64D 11/0648 |
| 2021/0214088 | A1* | 7/2021 | Kigoshi | B64D 11/06 |
| 2023/0312105 | A1* | 10/2023 | O'Hara | B64D 11/0643 244/118.6 |

\* cited by examiner

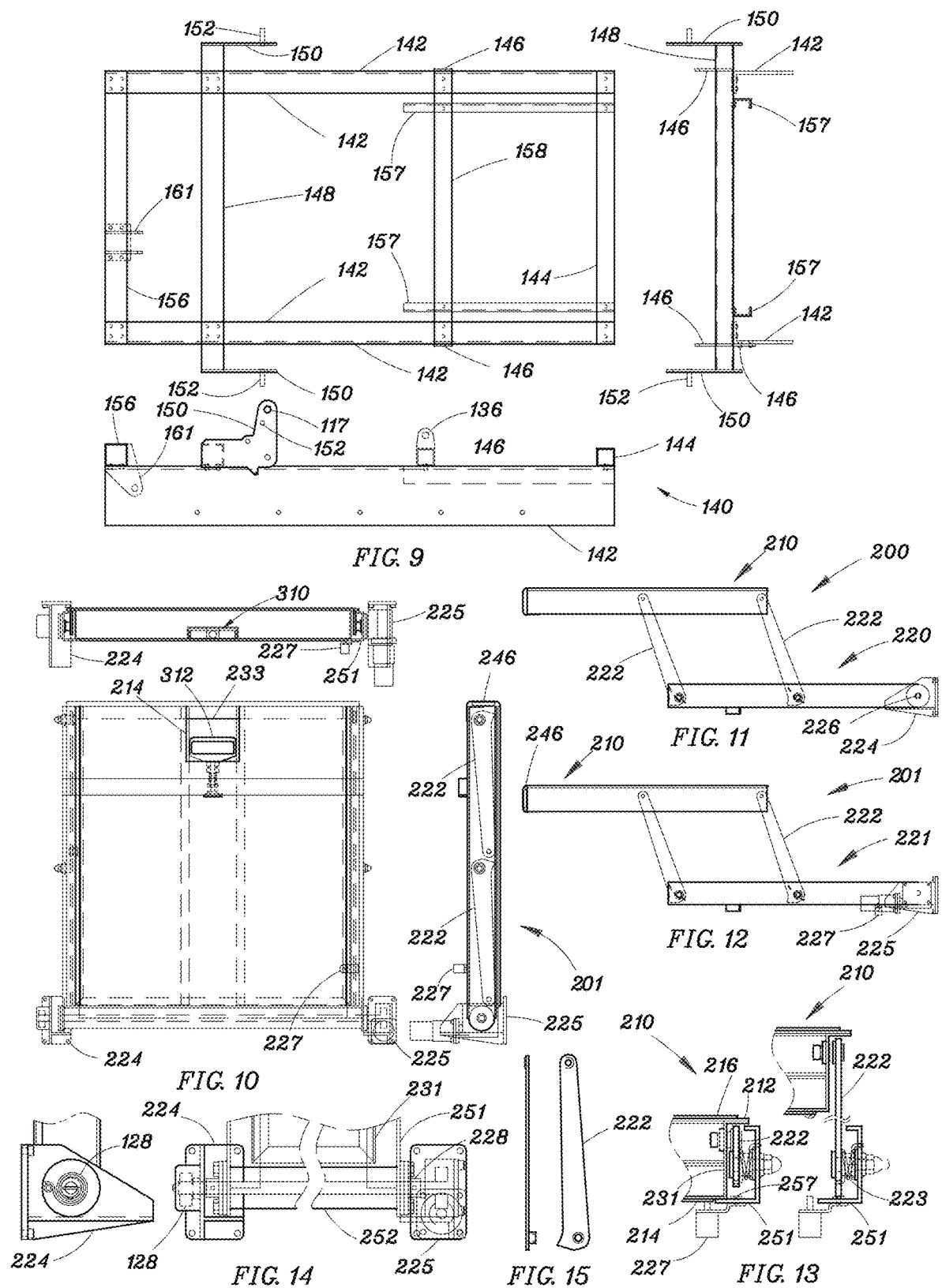

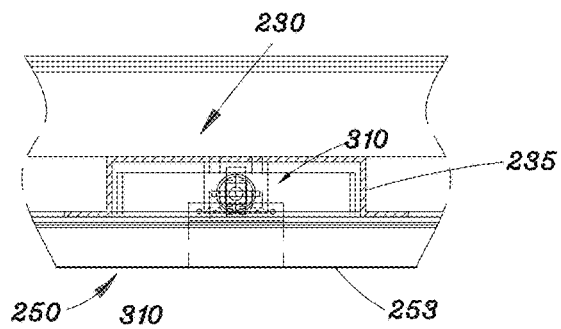
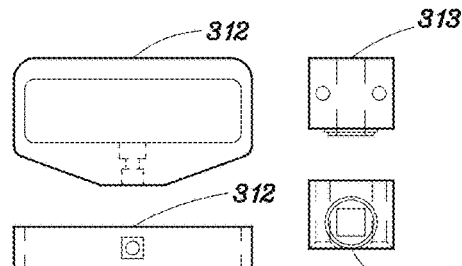
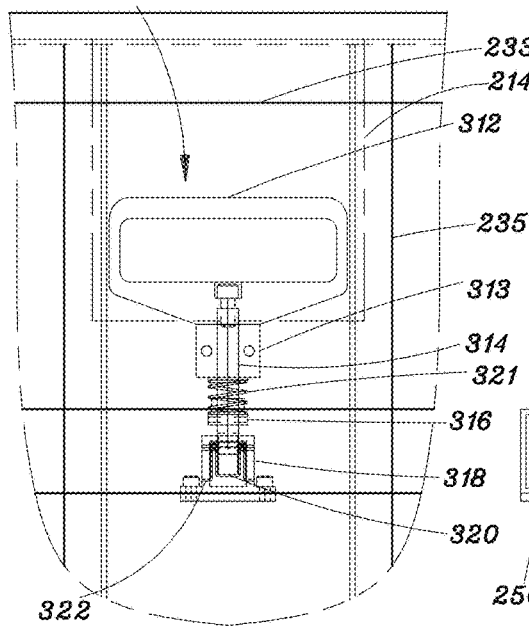
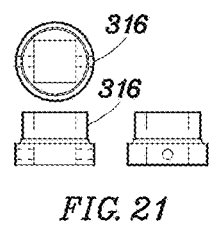
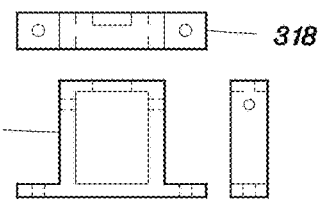
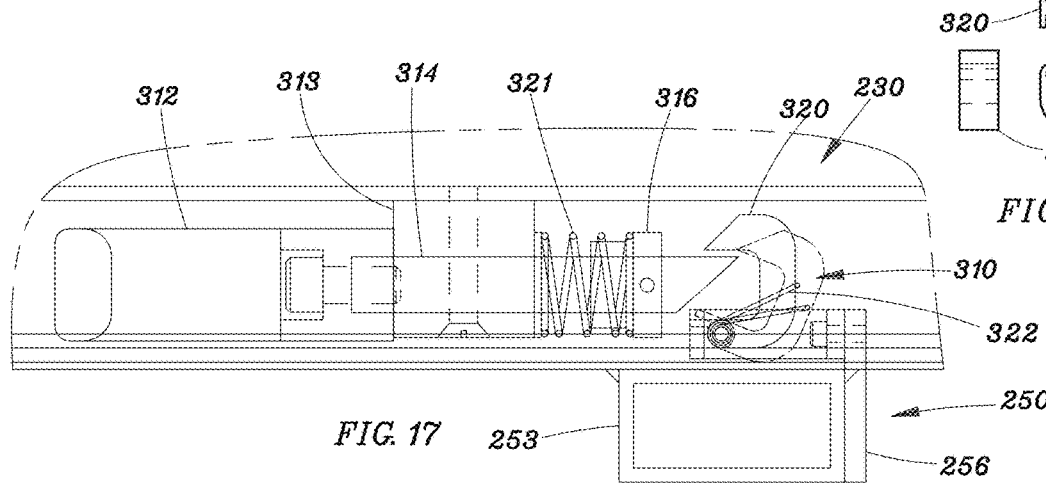

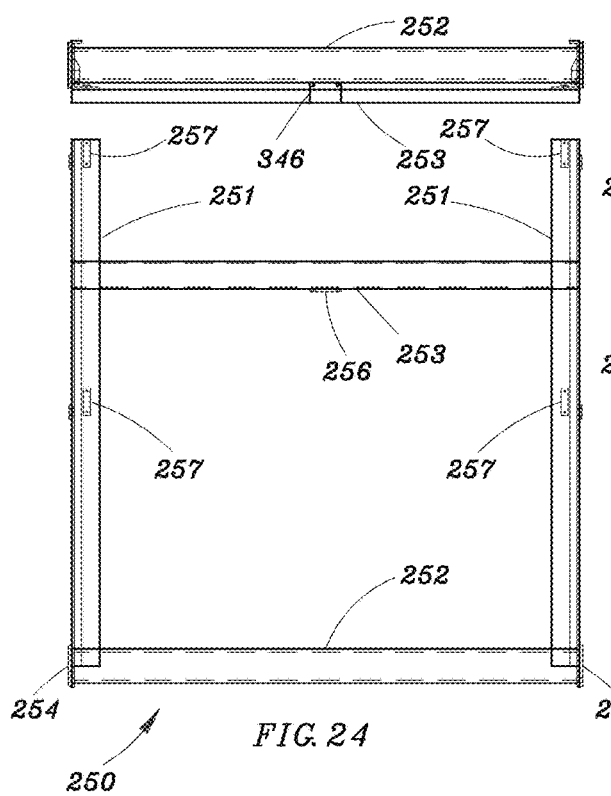
FIG. 24
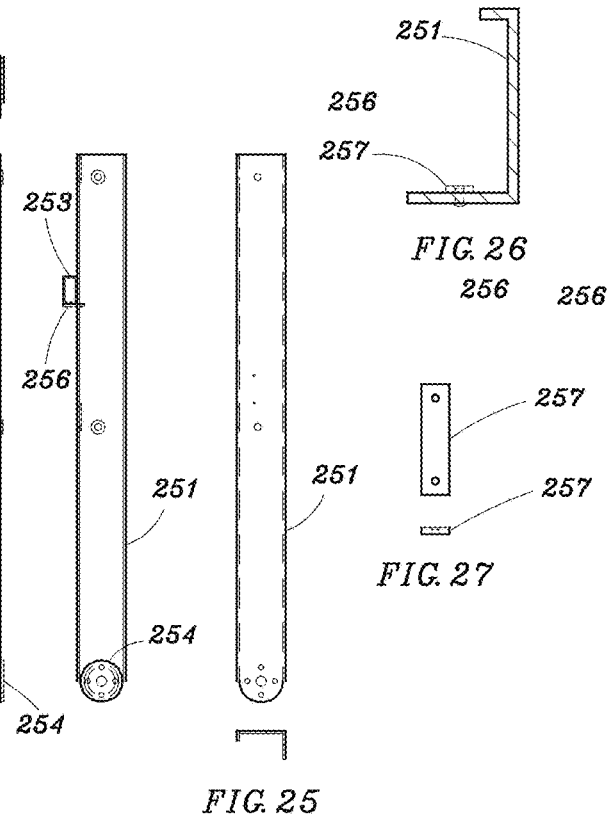
FIG. 25
FIG. 26
FIG. 27
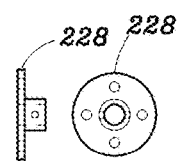
FIG. 29
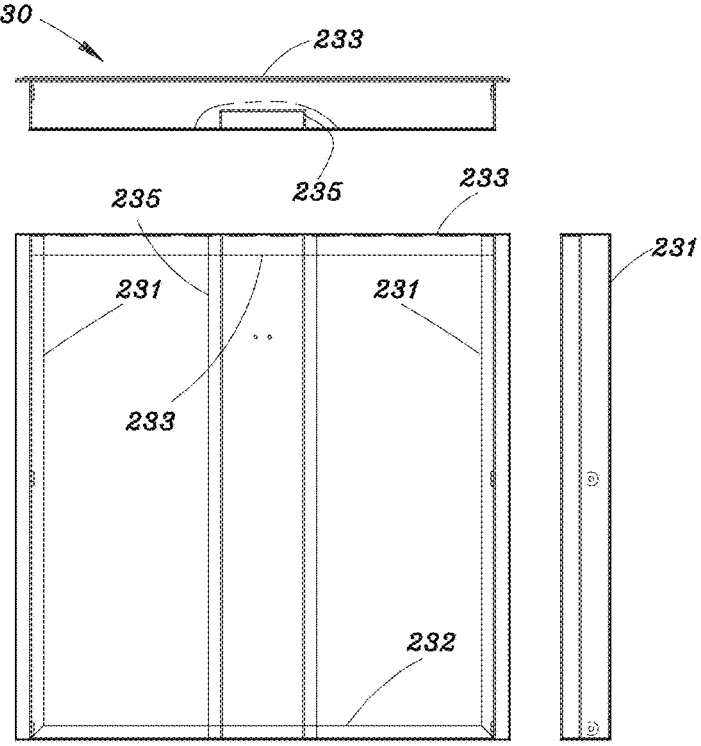
FIG. 28

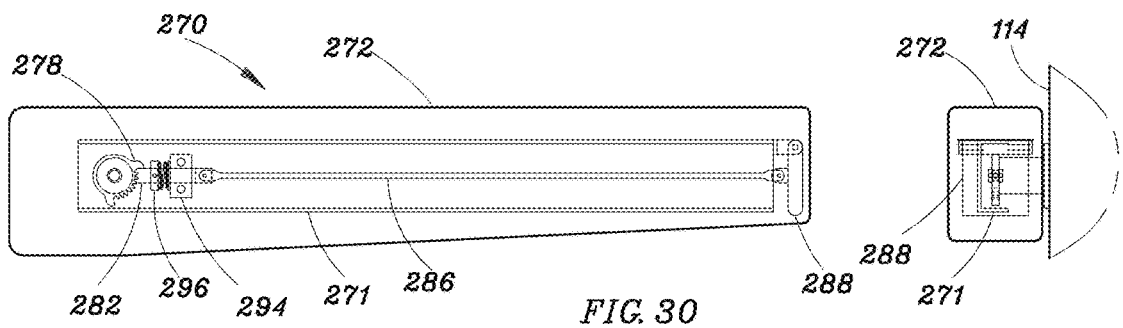
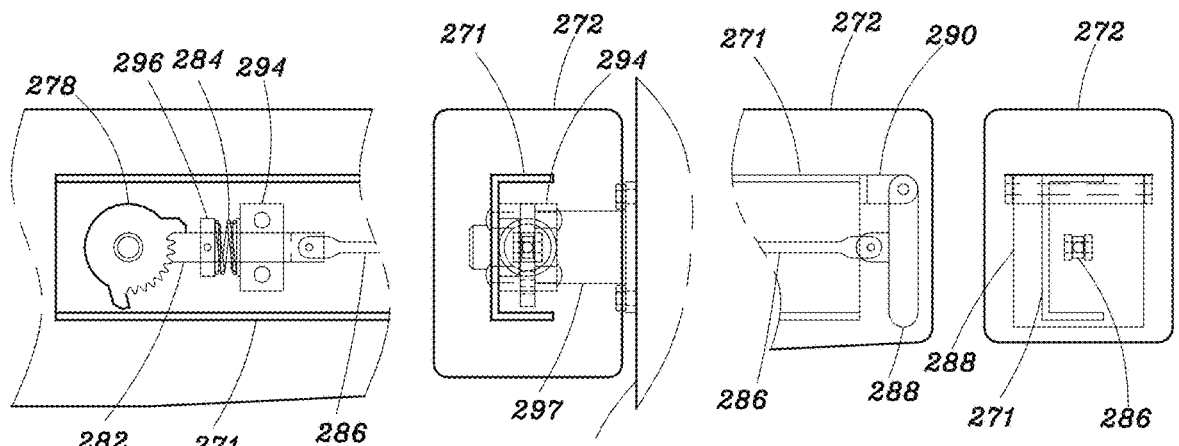
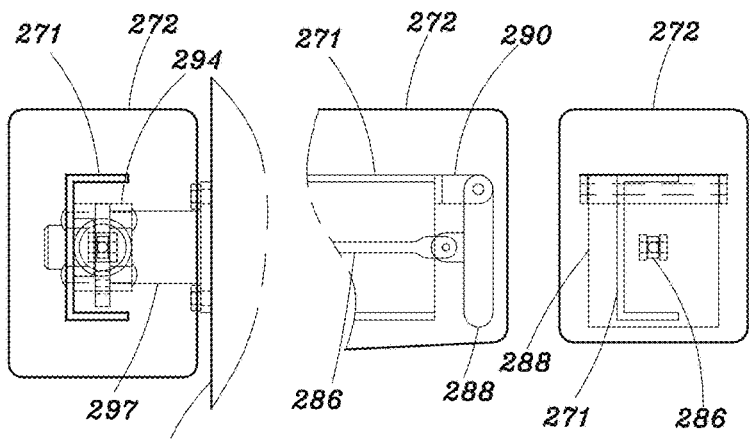
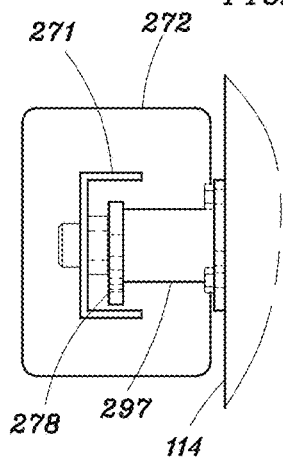
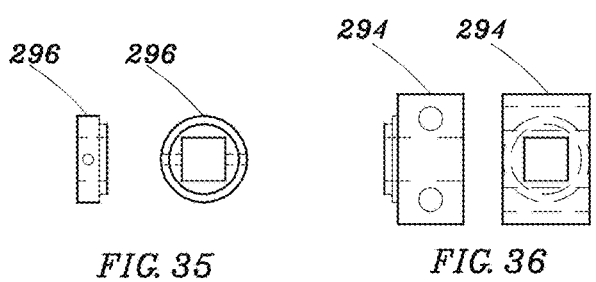
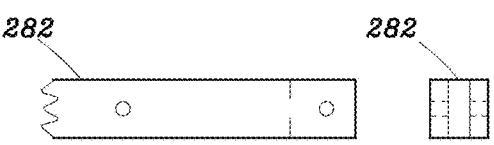
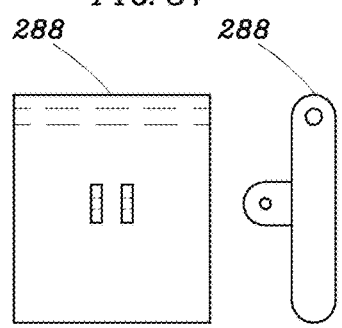
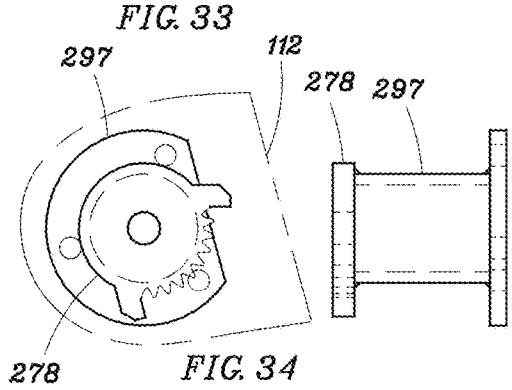

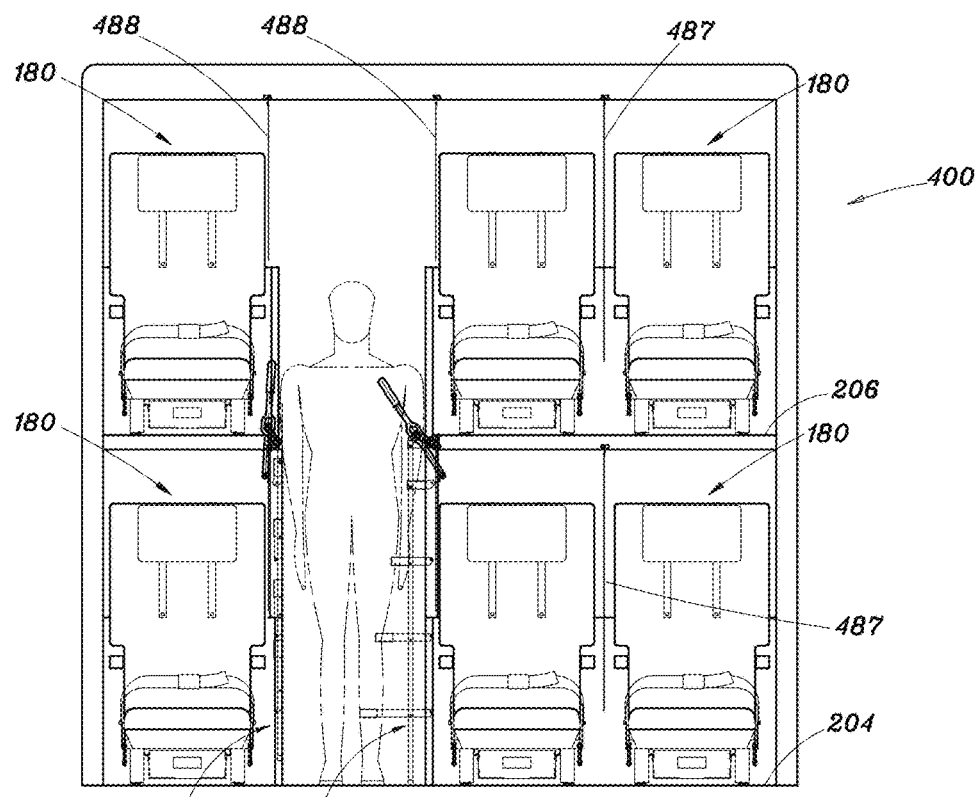
FIG. 39
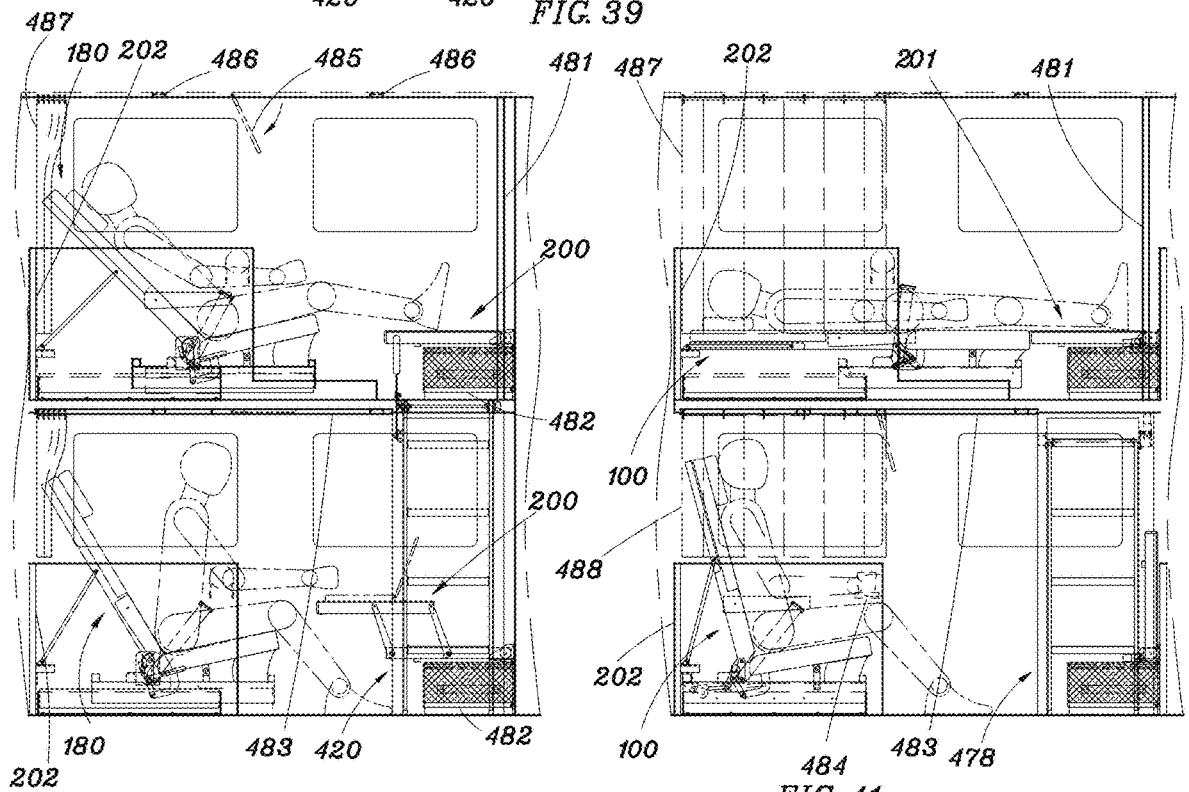
FIG. 40
FIG. 41

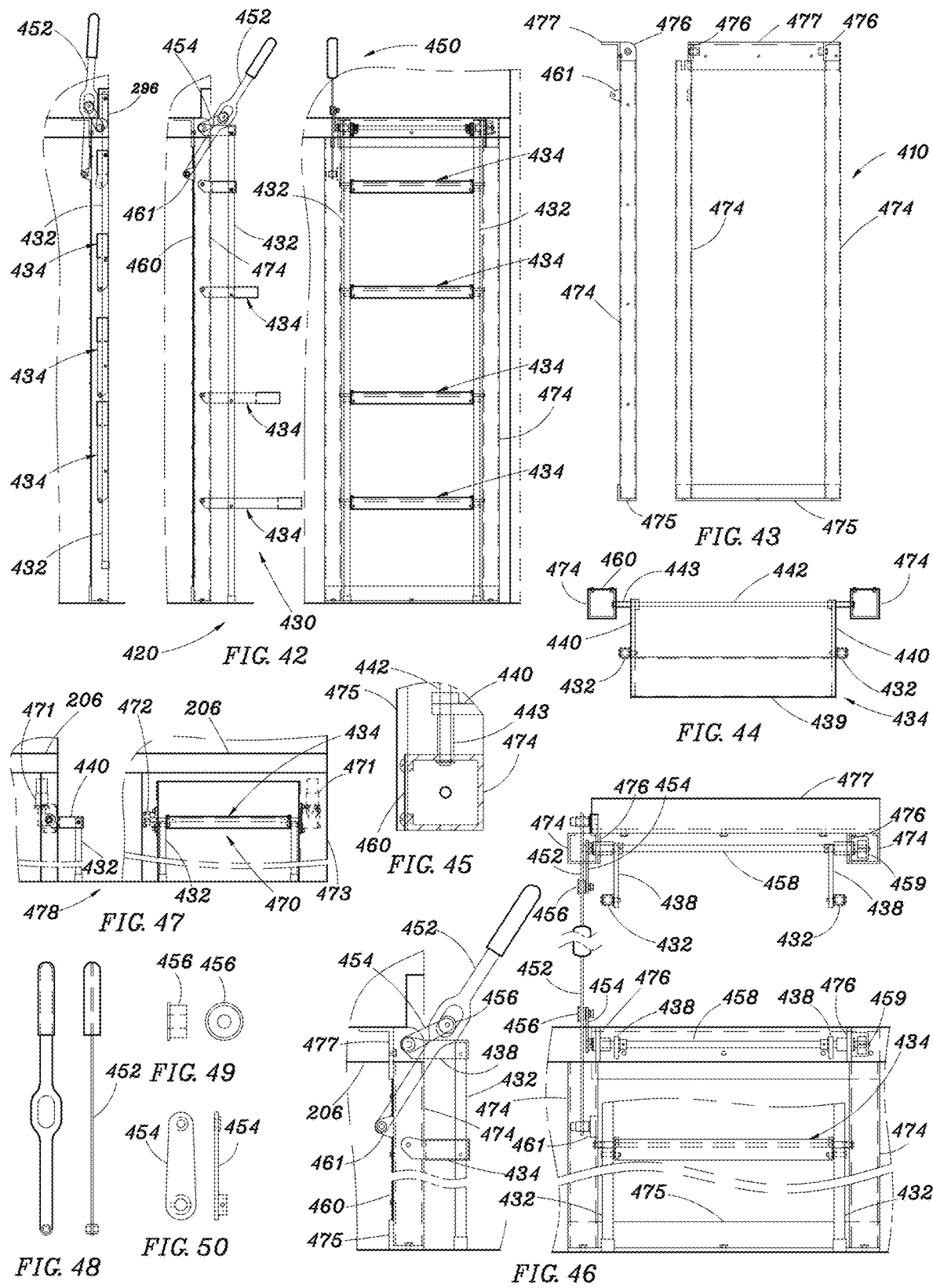

DOUBLE-DECK PASSENGER VEHICLE

TECHNICAL FIELD

The invention is related to a passenger vehicle having an aisle and double decks on both sides of the aisle for seating.

BACKGROUND OF THE INVENTION

In public transportation such as buses, trains, or airplanes, most seats in vehicles are sitting only to maximize their capacities. There is no conventional passenger vehicle providing two decks on the aisle to double its seating areas and having reclining seats for sitting comfort.

BRIEF SUMMARY OF THE INVENTION

As most travelers have experienced tiresome trips on mass transportation, there is a great need to improve the traveling comfort with more affordable fares in existing vehicles. A previous disclosure in U.S. patent Ser. No. 11/198,378 titled 'Double-Deck Passenger Vehicle' has presented a concept that conventional passenger vehicles will have an upper deck above the floor deck (or lower deck) to double its seating areas. Each deck has a ceiling height about the same as midsize sedans, and hence the height of the vehicle will not increase very much. The small increase in height will also minimize the effects of wind drag and lateral instability on vehicles, especially high-speed trains which are getting even faster and longer, becoming very efficient and widespread mass transportation worldwide.

Along the aisle of the vehicle, both decks are divided into seating sections with partition walls, and each seating section has only one row of power reclining seats. Each seat has a separately mounted power footrest to enhance sitting comfort and form a complete sleeping bed. The disclosure presented a simple and unique design for the seat. The design uses a pair of linear slides and a pair of tipping bars to recline the seatback, and a link between the seatback and cushion to achieve sitting comfort at any reclined position and form a flatbed with the footrest while allowing a short seat height to make double-deck seating feasible.

The concept does have merit; however, presenting only one type of reclining seat for more than one type of mass transportation is not workable. It may need power drive seats in trains and airplanes, but not in buses. Some buses may need all manual. Besides, there was one mistake in the footrest design. The power footrest has a second drive to raise the footrest to a table position and can stop at various lower positions that would allow it to misuse and fail prematurely. For reliability, the second drive will be replaced with manual operation and allow the footrest only stopping at the table position. Raising the footrest by hand from the footrest position to the table position is as quick and easy as pulling out a drawer without any complication of a power drive.

Therefore, this disclosure is specifically an improvement on the previous concept to encompass diverse designs to meet the specific needs of each vehicle. For easy understanding, the buses will present with manual seats and ladders, and trains and airplanes with power seats and ladders. However, each type of vehicle can have either manual or power for its seats and ladders to best fit its purpose.

Hopefully, the new seating concept could be commercially feasible and make comfort for long-distance travel with affordable fares become a reality. And people would give up driving their own cars to save energy and instead take public transportation to have more pleasant trips. Meanwhile, public transportation would operate more efficiently and consequently help mitigate climate change.

In this disclosure, the design of the seats will present first and then follow by seating arrangement in buses, trains, and airplanes.

BRIEF DESCRIPTION OF THE DRAWINGS

In the following detailed portion of the description, the teachings of the seat and passenger vehicles will explain in more detail with reference to the example embodiments shown in FIGS. 1 through 52.

FIG. 9 is an isometric view of the base frame for the manually operated reclining seat. The electric driven reclining seat uses the same frame, but with an extra bracket shown in phantom lines for mounting the motorized worm gear.

FIG. 10 is an isometric view of the electric driven footrest assembly.

FIG. 11 is a side view of the manually operated footrest assembly with the footrest in the table position.

FIG. 12 is a side view of the electric driven footrest assembly with the footrest in the table position.

FIG. 13 is a partial cross-sectional view of the footrest assembly when working as a footrest and another view on the right shows the footrest in the raised position working as a table.

FIG. 14 is a partial front view and side view of the electric driven footrest assembly.

FIG. 15 is a front view and side view of the parallel lifting arm of the footrest assembly.

FIG. 16 is an isometric view of the handle assembly of the manual locking device of the footrest assembly.

FIG. 17 is a side view of the handle assembly of the footrest assembly.

FIG. 18 is a front view and top view of the handle of the handle assembly.

FIG. 19 is a front view and top view of the guiding block of the handle assembly.

FIG. 20 is an isometric view of the locking bar of the handle assembly.

FIG. 21 is an isometric view of the rear spring seat of the handle assembly.

FIG. 22 is an isometric view of the lock retainer of the handle assembly.

FIG. 23 is an isometric view of the hook of the handle assembly.

FIG. 24 is an isometric view of the support frame of the footrest assembly.

FIG. 25 is an end view and side view of the channel bar of the support frame.

FIG. 26 is a partial cross-sectional view of the channel bar of the support frame, with the landing pad.

FIG. 27 is an end view and top view of the landing pad of the supporting frame.

FIG. 28 is an isometric view of the footrest frame.

FIG. 29 is a side view and end view of the shaft bracket of the footrest support.

FIG. 30 is a side view and front view of the armrest assembly.

FIG. 31 is a side view and front view of the rear part of the armrest assembly.

FIG. 32 is a side view and front view of the front part of the armrest assembly.

FIG. 33 is a cross-sectional front view of the rear end of the armrest assembly.

FIG. 34 is a side view and front view of the tooth disk and tubular bracket of the armrest assembly.

FIG. 35 is a side view and front view of the guiding block of the armrest assembly.

FIG. 36 is a side view and front view of the supporting block of the armrest assembly.

FIG. 37 is a side view and front view of the locking bar of the armrest assembly.

FIG. 38 is a rear view and side view of the releasing lever of the armrest assembly.

FIG. 39 is a cross-sectional front view of the bus.

FIG. 40 is a cross-sectional side view of the seating section in buses.

FIG. 41 is a cross-sectional side view of the seating section in trains and airplanes.

FIG. 42 is a front view and side view of the manual ladder, one showing in the extended position and a side view in the retracted position on the left.

FIG. 43 is a side view and front view of the ladder structure.

FIG. 44 is a cross-sectional top view of the ladder assembly.

FIG. 45 is a partial cross-sectional top view of the ladder assembly.

FIG. 46 is a partial isometric view of the ladder assembly.

FIG. 47 is a partial side view and front view of the electrically driven ladder.

FIG. 48 is a side view and front view of the handle of the handle assembly.

FIG. 49 is a side view and front view of the roller of the handle assembly.

FIG. 50 is a side view and front view of the lifting arm of the handle assembly.

DETAILED DESCRIPTION OF THE INVENTION

Figure 1:
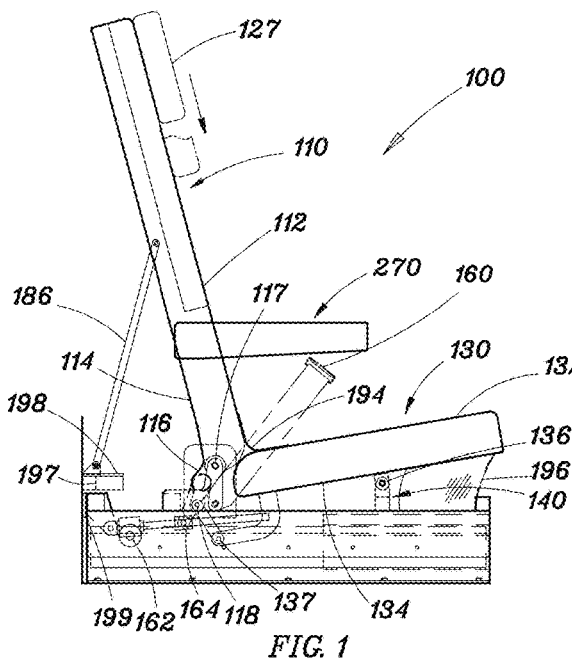
FIG. 1 is a side view of the electric driven reclining seat.

The following detailed description of seats and the seating setup in a double-deck passenger bus will describe by the embodiments. Unless otherwise specified, in all descriptions the front of a part refers to the side toward the front of the seat. All seats, footrests, and ladders are of light weight alloys like aluminum. Therefore, all engaging holes must have reinforced inserts but not shown. The parts made of high strength alloys mention as alloys. Some parts may need reinforcing pads or bushings on their engaging places, the reinforced elements are shown but not identified. Safety covers must install as needed but not shown.

The light-weight alloys are chosen for airplanes; however, many parts may be of steel alloys for easy mass production to save costs even with increase of weight, especially for trains and buses.

Electric Driven Reclining Seat:

Pictorial views show on FIGS. 1, 4, 5, and 41.

An electric-driven reclining seat 100 lay in the longitudinal direction with its connecting hinges in the transverse direction. The electric-driven reclining seat 100 presented in the previous disclosure U.S. patent Ser. No. 11/198,378, shows on FIG. 1. The seat 100 comprises a seat cushion 130, a seatback 110, a pair of armrests 270, a safety belt 160, a base frame 140, a seatback power drive, a pair of connecting links 126, a pair of tipping bars 186, a pair of linear slides 190, and a pair of footing angle bars 171. Since the electric-driven reclining seat 100 is the same as a manual-operated reclining seat 180 shown on FIG. 2 except the seatback drive, many of its parts also show on FIGS. 3 and 6.

The seatback 110 has an upholstery 112 with soft cushion inside, on its upper side supported by a rigid frame 114 underneath. The seat cushion 130 also has an upholstery 132 with soft cushion inside, on its upper side supported by a rigid frame 134 underneath. The upper and lower faces of both seatback 110 and cushion 130 assume to be parallel. The seatback frame 114 and cushion frame 134 hinge individually on the base frame 140. Each hinge connection has two physical locations, one on each side of the seat 100. The seatback frame 114 has two seatback arms 116, one mounted on each side at its bottom. Each seatback arm 116 has two holes: a seatback hinge hole 117 for hinging on the base frame 140 and below the bole a seatback link hole 118 for connecting to one of the links 126. The distance between the seatback hinge holes 117 and seatback link holes 118 names as seatback arm length. There is a height adjustable pillow 127 positioned on the upper side of the seatback upholstery 112 and having a pair of slots on its back side to be held by a pair of flexible stripes 129. The flexible strips 129 fasten their ends detachably on the upholstery 112.

The cushion frame 134 hinges on the base frame 140 at cushion hinge holes 136. The cushion frame 134 has two rear arms 138 individually mounted on its sides and extended diagonally downward to provide cushion link holes 137 for connecting to the other ends of the links 126. As the seatback 110 reclines, the links 126 move the seat cushion 130 to tilt at different pace. The cushion hinge holes 136 are located vertically lower than the seatback hinge holes 117 such that when the seatback 110 tilts to the horizontal, the cushion 130 will also tilt to the horizontal with its surface lined up with the seatback to form the upper portion of a bed. At the sitting position, the seat back 110 is to be set at 15 degrees from the vertical and with the connection between seatback 110 and cushion 130, the cushion 130 will tilt its front end up about 10 degrees as shown on FIG. 1. When the seatback reclines to 45 degrees from the vertical, the cushion will tilt its front end up further to about 13 degrees, a maximum. A piece of elastic upholstery sheet 194 secures one end to the upper surface of the seatback 110 and the other to the seat cushion 130 to close the gap between them.

At the seatback hinge holes 117, a stub shaft 124 with a round flange, mounts on each of the seatback arm 116 from inside with screws, to hinge the seatback 110 on the base frame 140. To minimize the power required for operating the seat 100, a spiral torsion spring 128 installs on the shaft 124 at the shaft's slotted end. The outer end of spring 128 anchors to a pin 152 mounted on the base frame 140. The pictorial views show on FIGS. 4 and 5.

Seatback Drive:

Pictorial views show on FIGS. 1 and 9.

For the electric-driven seat 100, the seatback drive comprises a motorized worm gear 162 with a screw output shaft and a nut 164. The worm gear 162 hinges on a hinge bracket 161 of the base frame 140. Its screw shaft engages with the nut 164. Nut 164 has a blind hole on each side to hinge on a fork arm mounted on the seatback frame 114. As the output shaft of the worm gear 162 rotates, it moves the nut 164 to tilt the seatback 110. With the reaction from the pair of tipping bars 186, the seat 100 will slide on the pair of linear channel slides 190.

Manual Reclining Seat:

Pictorial views show on FIGS. 2-8, 40, and 51.

The manual reclining seat 180 has the same seatback 110, seat cushion 130, and links 126 as the electric driven reclining seat 100. To minimize the effort needed to manually recline seat 180, the cushion hinge 136 should be located closely below the center of gravity of average persons. Since the cushion hinge must be located closer to the seatback hinge than the electric driven seat 100, the seatback arm length, the length of the links 126, and the cushion hinge holes 136 and link holes 137 must readjust as shown on FIG. 2. The power seat 100 could have the same cushion hinge location as the manual seat 180. In this disclosure, the previous version remains intending to show the flexibility of the design.

At the left side of seat 180, the seatback frame 114 has the same stub shaft 124 and torsion spring 128 as the power seat 100, mounted on the seatback hinge 117. Its right-side mounts a manual locking device 170. The manual locking device 170 comprises a circular locking teeth sector 178 with a guarding plate 177 on its outer face, a locking handle 172, and a tension spring 173. The teeth sector 178 has locking teeth on its circular periphery and mounted on the seatback arm 116 concentric with the seatback hinge hole 117. The locking handle 172 is a weldment comprising a teeth head 174, a round spacer 176, and a handle arm 175. The teeth head 174 has locking teeth to engage with the teeth sector 178 and the handle arm 175 hinges on the base frame 140 on the tangent line at the middle point of its locking teeth. The tension spring 173 attaches one end on the handle arm 175 and the other on the base frame 140 to force the teeth head 174 engaging with the circular teeth sector 178, locking the seatback 110 to selected positions. To change the reclining positions, simply pull the handle arm 175 upward until stopped by a pin 179 mounted on the base frame 140, to disengage with the circular teeth sector 178, and hold it, then either lean the seatback 110 backward manually or move forward by the force of the torsion springs 128. Once releasing the handle 175, the seatback 110 will automatically lock.

Armrest:

Pictorial views show on FIG. 30-38.

An armrest 270 mounts on each side of the seatback 110 of reclining seat 100 and 180. Each armrest contains an armrest upholstery 272 and an armrest frame assembly enclosed by the upholstery 272. The following description is when the seatback is in the sitting position, and the upper face of the armrest 270 is set in the horizontal position, the highest position as shown on FIGS. 1 and 2. In the previous design, each armrest 270 allows it to be pulled upward freely without unlocking. It is unsafe and complicated in design. Therefore, an improved design is presented.

The armrest frame assembly comprises a circular tooth disk 278, a locking bar 282 of a square cross-section, a guiding block 294 with a square hole, a rear spring seat 296, a channel bar 271, a compression spring 284, a connecting rod 286, and a releasing lever 288. The connecting rod 286 has flattened ends, each end with a connecting hole. Circular tooth disk 278 is made of hardened alloy and welds concentrically on a stub tubular bracket 297. The tubular bracket 297 has a round disk base with a cut off to minimize encroaching the seatback cushion 112 as shown in FIG. 34, and mounts on the seatback frame 114 with three screws. Channel bar 271 has its flanges pointing inward and hinges its rear end concentrically on the circular tooth disk 278, with a shoulder screw and spacer.

The circular tooth disk 278 has symmetrical teeth on part of its periphery to lock the armrest 270 in both rotating directions, and a raised stop on both ends to automatically stop at the sitting position and bed position, respectively. When the armrest 270 is in bed position, its upper face is even with the surface of the seatback 110 to serve as a part of the bed. The rear end of locking bar 282 has locking teeth to engage with the circular tooth disk 278. The locking bar 282 slidably engages in the square hole of the guiding block 294 mounted on the channel bar 271. The rear spring seat 296 is located behind the guiding block 294 and locks to the locking bar 282 with a pin. The connecting rod 286 hinges its rear end on a slot in the front end of locking bar 282, and its front end to a fork on the releasing lever 288, which hinges its upper end on another fork 290 mounted on the front end of the channel bar 271. The compression spring 284 rests its rear end on the rear spring seat 296 and its front end on a front spring seat mounted on the rear side of the guiding block 294, to force the locking bar 282 in the locked position. By pulling the lower end of the releasing lever 288 forward to slide the locking bar 282 until the rear spring seat 296 stops on the front spring seat of the guiding block 294, the locking bar 282 will disengage with the tooth disk 278, permitting the armrest 270 to swing to various positions. Once releasing the releasing lever 288, the compression spring 284 will force the locking bar 282 back to lock the armrest 270.

Figure 3:
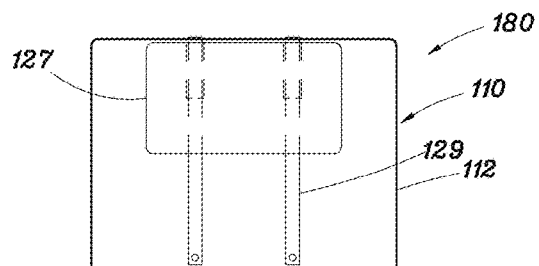
FIG. 3 is a front view of the manually operated reclining seat.

Base Frame and Linear Slides:

Pictorial views show on FIGS. 3 and 9.

Base frame 140 as shown on FIG. 9 comprises a pair of longitudinally laid angle bars 142, four transverse square tubular beams, front 144, second 158, third 148, rear 156 respectively, and a pair of longitudinally laid channel bars 157. All the parts rivet together to prevent distortion. The angle bars 142 individually position near the sides of the seat 100, 180 and have horizontal legs pointing inward and the inner walls of the vertical legs using screws secures to the outer sides of the linear slides 190. The inner faces of the linear slides 190 individually mount on the outer faces of the vertical legs of footing angle bars 171 with screws. The footing angle bars 171 mount their horizontal legs to the floor with screws. Channel bars 157 longitudinally lay and position symmetrically on the base frame 140 with their flanges pointing inward and mount individually on the front beam 144 and second beam 158 from below to work as a guide for a drawer 326.

The third beam 148 extends its ends beyond the angle bars 142 to mount individually a vertical plate 150 for providing the seatback hinge hole 117, a hole below for mounting the safety belt 160, and a pin 152 for holding the spiral spring 128. There are a pair of vertical plates 146 individually mounted on the ends of the second beam 158 and pointing upward to provide cushion hinge holes 136. For power seat 100, a hinging bracket 161 mounts on the rear beam 156 for mounting motorized worm gear 162.

The linear slide 190 is a heavy duty telescopic-channel slide with ball bearings, commonly used in cabinet drawers, providing sufficient overhang capacities and great lateral rigidity. The base frame 140 should make as long as possible to accommodate long linear slides 190 to have a stroke longer than required. The extra stroke will provide more overhang capacity and lateral rigidity. A seatback stop 198 mounts on a stationary support 197, to hold the seatback 110 in horizontal position when fully reclined, and a base frame stop 199 mounts on the stationary structure to hold the base frame 140 in the sitting position after retracting.

Figure 2:
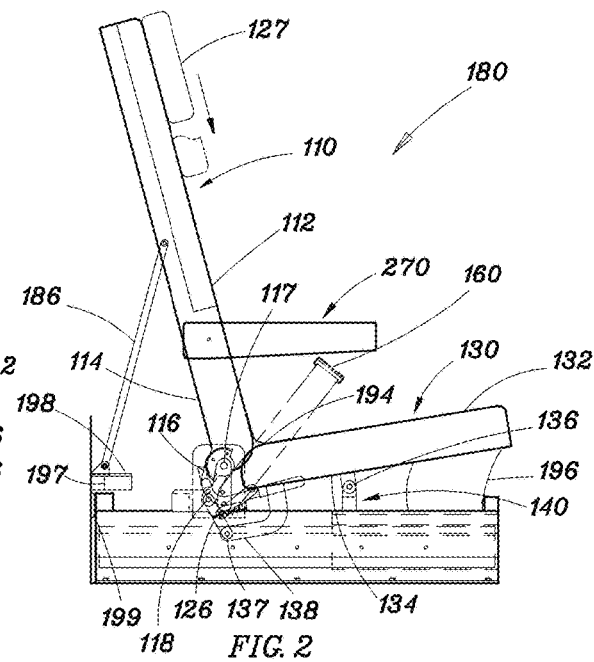
FIG. 2 is a side view of the manually operated reclining seat.
Figures 4, 5:
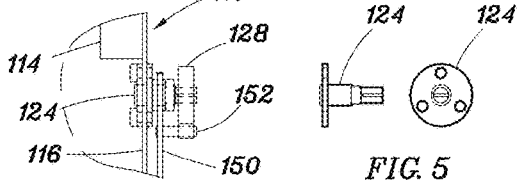
FIG. 4 is a partial cross-sectional front view of the seatback hinge.
FIG. 5 is a side view and end view of the seatback hinge shaft.
Figure 7:
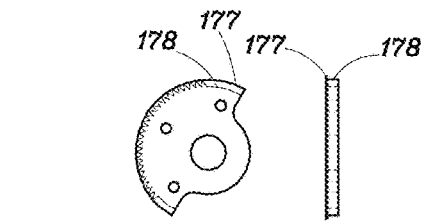
FIG. 7 is a front view and side view of the circular locking teeth sector with the guarding plate on its outer face for the manually operated reclining seat.
Figure 6:
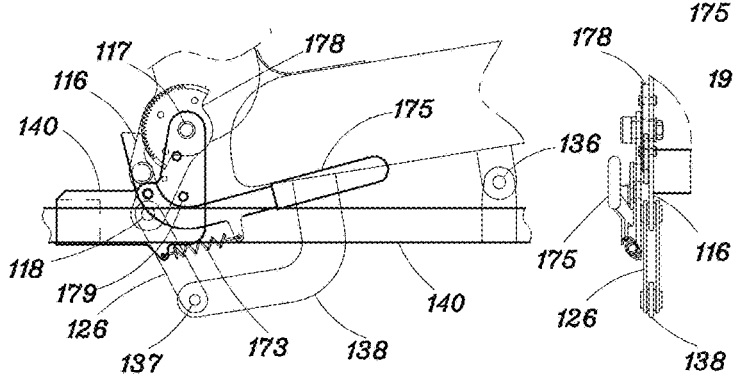
FIG. 6 is a partial side view and front view of the locking device of the manually operated reclining seat.
Figure 8:
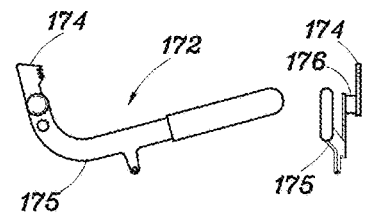
FIG. 8 is a front view and side view of the locking handle on the manually operated reclining seat.

Mounting Tipping Bars:

Pictorial views show on FIGS. 1, 2, and 6.

There is a pair of tipping bars 186 hinging individually their front ends on the sides of the seatback frame 114, and their rear ends on a stationary structure 197. As the seatback 110 reclines, the reaction of the tipping bars 186 on the seatback 110 will slide the base frame 140 on the pair of linear slides 190. To achieve seat 100, 180 not invading the space behind during reclining, the rear end of the tipping bar and the seatback hinge must be at the same elevation. And the distance between the seatback hinge 117 and the hinge of the tipping bar on the seatback 110 must be the same as the length of the tipping bars and the distance between seatback hinge 117 to the top of seatback 110 must not exceed twice the length of tipping bars.

Seating in Double Deck Buses:

Pictorial views show on FIGS. 2, 3, 39, and 40.

In conventional coach buses, each vehicle 400 along its aisle is going to have two seating decks, lower deck 204 and upper deck 206, on both sides of the aisle. Both decks are divided into equally spaced seating sections with partition walls 202. Therefore, each seating section has four seating cells: one upper seating cell and one lower seating cell on each side of the aisle. In each seating cell, there is only one row of manual seats 180 with a separately mounted footrest 200 to form a comfortable seat and sleeping bed. For safety and good visibility, partition wall 202 covers only the lower half of the deck height, allowing a clear view on the upper half.

Actual dimensions are used in the seating to have a sense of reality. In highways, the maximum legal width of buses is eight feet six inches (102 inches). To provide decent width for the manual seat 180, one seating cell could have two seats on one side of the aisle and one seat on the opposite side. That allows adequate spaces for structure walls of vehicle 400 and the walking aisle. Hence, each seating section along the aisle can accommodate six passengers. By taking advantage of the seat's low profile, the height of the seat cushion 130 from the floor to its front edge at the sitting position shown on FIG. 2 is set to 12 inches, and the ceiling height of each deck 48 inches. Both dimensions are about the same as midsize sedans. When seat 180 reclines to the horizontal to form a bed with its footrest 200, its height from the floor to its surface becomes 11 inches as shown in FIG. 41. Allowing two-inch thickness for the upper deck floor 206, the height from the floor to the upper deck ceiling is 98 inches, a dimension not much higher than that of conventional coach buses. As a comparison, a six-foot tall human figure is shown standing on the aisle.

The dimensions of the seating arrangement shown on FIG. 39 are the following. With the vehicle width 102 inches and allowing three inches for the vehicle wall on each side, it has 96 inches of interior width for seating. The sitting width of seat 180 is 18 inches, and with a 2-inch-wide armrest 270, the seat overall width is 22 inches. The space between seat 180 and its adjacent wall is one inch. The seat wall along the aisle is one inch thick. The space between the pair of seats 180 is three inches. That allows a 21-inch-wide aisle, adequate in a vehicle. The longitudinal space between the partition walls is 76 inches and with a one-inch partition wall 202, the pitch of each seating section is 77 inches. The dimensions are selected purely by intuition.

Manual Footrest Assembly

Pictorial views show on FIG. 10-29.

In each seating cell on a bus 400, manual seat 180 mounts close to the rear partition wall 202 facing forward, and a manual footrest assembly 200 mounted on the front partition wall 202. The footrest assembly 200 comprises a footrest 210 and a footrest support 220. In all the following description of the footrest assembly 200, it is in the horizontal position and its front side is facing seat 180. The footrest 210 mounts on the footrest support 220 and has three positions: a horizontal footrest position working as a footrest for sitting comfort and forming a bed with the reclining seat 180, a table position for eating or working, and a vertical storage position. In the horizontal footrest position the footrest support 220 hinges its rear end on the front partition wall 202. By manually rotating the footrest assembly 200 on the hinge, it will place in the vertical storage position. By pulling the footrest 210 forward from the horizontal footrest position, the footrest will rise to the table position, which is higher and closer to seat 180. At the horizontal footrest position the footrest holds by its own weight and at the table position it holds by its own weight and spring forces.

Footrest

Pictorial views show on FIG. 10-29.

Footrest 210 comprises a footrest frame 230, a bottom plate 214, upholstery 212 with soft cushion inside, and a locking device 310 to lock the footrest 210 on the footrest support 220. The footrest frame 230 shown in FIG. 28 is a weldment comprising a pair of edge channel bars 231, a front angle bar 233, a rear channel bar 232, and a flanged channel bar 235. The edge channel bars 231 form longitudinal sides of the footrest frame 230, and their upper and lower sides are the exterior faces of the footrest frame 230. Each of the edge channel bars 231 has its upper flange pointing outward, and lower flange inward. The rear channel bar 232 is the same height as the edge channel bars 231 and connects to their rear ends. The front angle bar 233 connects to the front ends of edge channel bar 231 with a horizontal leg pointing rearward. The flanged channel bar 235 individually has an extra outward flange on its flanges as shown on FIG. 16 and lays longitudinally in the middle of the footrest frame 230, with its web on the upper side. The flanged channel bar 235 connects its front end to the front angle bar 233 and its rear end to the rear channel bar 232. The heights of the front angle bar 233 and flanged channel bar 235 are shorter than the edge channel bars 231 and their bottoms lay even with the edge channel bars 231. The space inside the flanged channel bar 235 is for installing locking device 310 and outside for mounting the upholstery 212.

The bottom plate 214 mounts on the bottom of the footrest frame 230 with screws and has an opening at the front part of the flanged channel bar 235, enabling a hand to reach the locking device 310. A sanitary sheet 216 covers the entire upholstery 212 and has its front end and rear fastened to the upholstery 212 with Velcro strips. To use footrest 210 as a table, detach the front end of the sanitary sheet 216 and flip to the back.

Manual Footrest Support

Pictorial views show on FIG. 10-29.

The footrest support 220 comprises a support frame 250, two pairs of identical parallel lifting arms 222 of alloys, a pair of shaft brackets 228 of alloys, a pair of spring hosing 224, each with a spiral spring, and a shaft 226 of alloys. The support frame 250 shown on FIG. 24 is a weldment comprising a pair of channel beams 251, a round tubing 252, a rectangular tubing 253, a pair of reinforcing pads 254, and a lock mounting plate 256. Channel beams 251 lay longitudinally and are spaced out to place the footrest 210 between them. The flanges of the channel beams 251 face inward with the shorter upper flange to have clearance with the footrest 210, and the longer lower flange to engage with the edge channel bars 231 of the footrest frame 230 from below, holding the footrest 210 in the horizontal footrest position. The rear end of each channel beam 251 has its flange removed and its web forms a semicircular edge to reduce the space with the partition wall. The reinforcing pads 254 individually mount on the outer faces of the channel beams 251, concentric with the semicircular ends and have shaft holes. Round tubing 252 connects to the webs of the channel beams 251 concentrically with the shaft holes. The rectangular tubing 253 mounts on the bottoms of channel beams 251 to support the lock mounting plate 256. The lock mounting plate 256 positions in the middle of rectangular tubing 253 and has two mounting holes on its upper side for mounting the manual locking device 310.

The shaft brackets 228 have a round disk base with a stub bushing and individually mount their bases using screws concentrically on faces of the reinforcing pads 254 on the channel beams 251, and lock to the shaft 226 with pins. Ends of the shaft 226 individually engage with the spring housings 224, with their springs lock to the ends of the shaft 226, creating a balancing torque to minimize the efforts for rotating the footrest assembly 220. Each spring housing 224 has a base to mount on the front partition wall 202 with screws and has a horizontal face extending inward to engage with the channel beam 251 of the footrest supports 220 for holding the footrest support 220 in the horizontal position.

The lifting arms 222 is a parallel linkage for lifting the footrest 210 to the table position. Each pair of lifting arms 222 places on each side of the footrest frame 230 in the longitudinal gap between the channel bar 231 of the footrest frame 230 and the channel beam 251 of the support frame 250. Both lifting arms 222 place vertically in line with one placed in front of the other. Both ends of each lifting arm have a welded-on reinforcing bushing. The front end of each arm 222 mounts a torsion spring 223 and hinges on channel beam 251 of the support frame 250, and its rear end hinges on channel bar 231 of the footrest frame 230 at a slightly higher elevation. As footrest 210 raises to the table position, the front end of each lifting arm 222 will land on a landing pad 257 of hardened alloy riveted on the flange of channel beam 251. At the table position, the hinges on footrest 210 must be at the front side of the hinges on the footrest support 220 closer to the seat 180 so that the weight of the footrest 210 will help hold itself in position.

Power Footrest Assembly

Pictorial views show on FIG. 10-29.

The footrest assembly 201 used in trains and airplanes is electric driven for rotating the footrest 210 from the horizontal footrest position to vertical storage position. The footrest assembly 201 has the same footrest 210 as in the manual footrest assembly 220. Its footrest support 221 is also the same as the footrest support 220 except the footrest support 221 has a motorized worm gear 225 replacing one of the spring housings 224 and the worm gear 225 has a long output shaft to lock to the other spring housing 224 located on the opposite side of the footrest support 221 as shown in FIG. 14. Like the spring housing 224, the housing of the worm gear 225 has a base to mount on the front partition wall and a horizontal face extending inward to engage with the channel beam 251 of the footrest support 221 to hold the footrest 210 in the horizontal footrest position.

There is an electric switch 227 mounted on the channel beam 251 of the support frame 250. When the footrest 210 is in the horizontal footrest position, the prong of the switch 227 touches the bottom of the footrest 210 to set the switch 227 to a position allowing the worm gear 225 to drive the footrest assembly 201 to the vertical storage position. When footrest 210 raised to the table position, the prong of switch 227 will disengage with the footrest 210 to turn off the worm gear 225 from operation.

For safety, the front side of the footrest 210 embeds with a pressure sensing strip 246 covering its entire width to sense any pressures on it. When the footrest 210 is in the horizontal footrest position and the seat 100 is reclining to form a bed with the footrest, as the cushion 130 reaches a minimum safety gap with the footrest 210, the sensor will turn on. If the seated person has his or her leg unknowingly on the floor, the seat cushion 130 will push the leg against the footrest 210. As soon as the leg touches the front side of the footrest, the sensing strip 246 will activate a control to immediately retreat the seat cushion 130 slightly and stop to avoid injuries to the leg. Besides, the motorized worm gear drive 162 of the seat 100 must have automatic reversing control to avoid accidents when encountering a sudden resistance. A beep sound may add to the alarming effect.

Footrest Locking Device

Pictorial views show on FIG. 16-23.

The footrest locking device 310 is manual and mounts inside the flanged channel bar 235 of the footrest frame 230. The following description is when the footrest 210 is in the horizontal footrest position and its front side is facing the seat. The locking device 310 comprises a handle 312 made of strong plastics or light weight alloys, a locking bar 314 with square cross-section, a guiding block 313 with a square hole, a compression spring 321, a rear spring seat 316, a lock retainer 318, a torsion spring 322, and a hook 320.

As shown on FIG. 17, the handle 312 positions near the front side of the footrest frame 230 and its rear part has a square blind hole to axially secure the front end of the locking bar 314 with a screw. The locking bar 314 slidably engages with the square hole of the guiding block 313, which is mounted on the flanged channel 235 using two screws. The rear spring seat 316 positions behind the guiding block 313 and engages with and locks to the locking bar 314 with a pin. The compression spring 321 rests its front end on a built-in spring seat of the guiding block 313 and its rear end on the rear spring seat 316, forcing the rear end of the handle 312 to rest on the guiding block 313. The rear end of the locking bar 314 has an inward taper underneath and an upper face to engage with an engaging face of the hook 320 with clearance. Hook 320 hinges on lock retainer 318 right below the engaging face and has a forward protruded end at the hinge to rest on the lock retainer to place itself in the locking position and held in the position by the torsion springe 322 mounted on the hinge pin. The lock retainer 318 mounts on the lock mounting plate 256 of the support frame 250 with two screws.

When footrest 210 is in the horizontal footrest position, by pulling the handle 312 forward to deflect the compression spring 321 until rear spring seat 316 rests on the guiding block 313, the locking bar 314 will completely disengage with the hook 320 and allow the footrest 210 to be pulled further to the table position. Pushing the footrest 210 back from the table position, the lower taper end of the locking bar 314 will push the hook 320 away until it reaches the engaging position, the hook 320 will automatically swing back and lock the footrest 210 in the horizontal footrest position. When the footrest 210 is in the vertical storage position, it can lower to the horizontal footrest position by pulling on the front angle bar 233 (see FIG. 10).

Ladders:

Pictorial views show on FIG. 42-50.

A ladder provides access to each upper cell on a bus and its operation is manual. A main ladder assembly 420 comprises a ladder support frame 410, a ladder assembly 430 containing the ladder, and a handlebar assembly 450. Main ladder assembly 420 is located close to the front partition wall 202 of seat 180 and could be pre-assembled then installed in place. In the following description of the main ladder assembly 420, the ladder assembly 430 is in an extended position to become a ladder with its front facing the aisle.

Ladder support frame 410 shown on FIG. 43 extends from the floor to upper deck and lays even with the aisle edge. The ladder support frame 410 is a weldment comprising a pair of vertical support columns 474, a top angle bar 477 having the lower parts of its vertical leg mounted on the rear face of the top of the support columns 474, a bottom angle bar 475 mounted at the bottom of the support column 474, and a pair of gusset plates 476 each with a shaft-supporting bushing, mounted on the front face of the top angle bar 477. The support columns 474 are spaced apart from each other to mount the ladder assembly 430 between them. Each support column 474 is a square tubing with a slot at its rear face, enabling the ladder assembly 430 to be mounted, and then covered with a plate 460 with screws.

Ladder assembly 430 comprises a pair of vertical footing bars 432 of alloys, four equally spaced ladder steps 434 positioned between the footing bars 432, and a pair of actuating arms 438 of alloys.

Each ladder step 434 shown on FIG. 44 is a weldment made with a step 439 of rectangular tubing and two ladder arms 440 individually welded to the sides of step 439. The upper face of each step 439 has triangular raises along its length for anti-skid. The rear ends of ladder arms 440 individually hinge on support columns 474 with a round bar 442. A tubular spacer 443 places around the round bar 442, between each ladder arm 440 and the support column 474 to laterally hold the ladder assembly 430 in place. The ladder arms 440 individually hinge on the pair of vertical footing bars 432 to create a parallel linkage. Actuating arms 438 are located at the elevation of the upper deck's structure. Each of the actuating arms 438 has a front hole and rear hole the same as ladder arms 440 and has its front hole hinges on the footing bar 432 and its rear hole has a bushing to lock to a drive shaft 458 of the handle assembly 450 with a pin.

When the drive shaft 458 rotates to extend the ladder assembly 430 out to become a ladder for climbing, the pair of footing bars 432 will stand on the floor to support loads and place steps 434 in the horizontal position. With steps 434 in the horizontal position, the front hinges of their ladder arms 440 are located lower than their rear hinges with a distance such that when the ladder assembly 430 is retracted to a vertical storage position, their exposed faces and the outer faces of the footing bars 432 will be positioned even with the front face of the ladder support frame 410, as shown on FIG. 42. The depth of the top ladder step 434 is the narrowest, and the ladder steps 434 below are wider with an equal increment, having the lowest step the widest for easy climbing.

Ladder Handle Assembly

Pictorial views show on FIG. 46, 48-50.

Ladder handle assembly 450 is located at the elevation of upper deck 206. It comprises a handle 452, a lifting arm 454, a roller 456 with one flange, the drive shaft 458 mentioned, and a spring housing 459 with a torsion spring. They are made of alloys except for the spring housing. The handle 452 is to be located on the far side of the ladder assembly 430 away from the front partition wall 202 as shown on FIG. 40. Shaft 458 has its ends individually supported by the bushings of the gusset plates 476. The lifting arm 454 positions on the outer side of the gusset plate 476 and has a bushing at its lower end to lock to the drive shaft 458 with a pin, and its upper end hinges the roller 456. with a shoulder screw.

The middle part of the handle 452 has a slot to rotatably engage with the roller 456 and its upper end a grip handle made of plastics or rubber-like materials, and its lower end hinges on the support column 474. With the hinge of the handle 452 located below shaft 458 at a distance twice the length of the lifting arm 454, the 90-degree angle needed to close and open the ladder reduces to 29.3 degrees. By offsetting the hinge of the handle 452 rearward such that it will have clearance with the footrest 200 on the upper deck, and after setting the ladder assembly 430 for climbing, the handle still can be reached by a passenger standing on the upper deck. A passenger standing on the aisle can also pull or lift the lowest step 434 to open or close the ladder assembly 430.

Power Ladder

Figure 52:
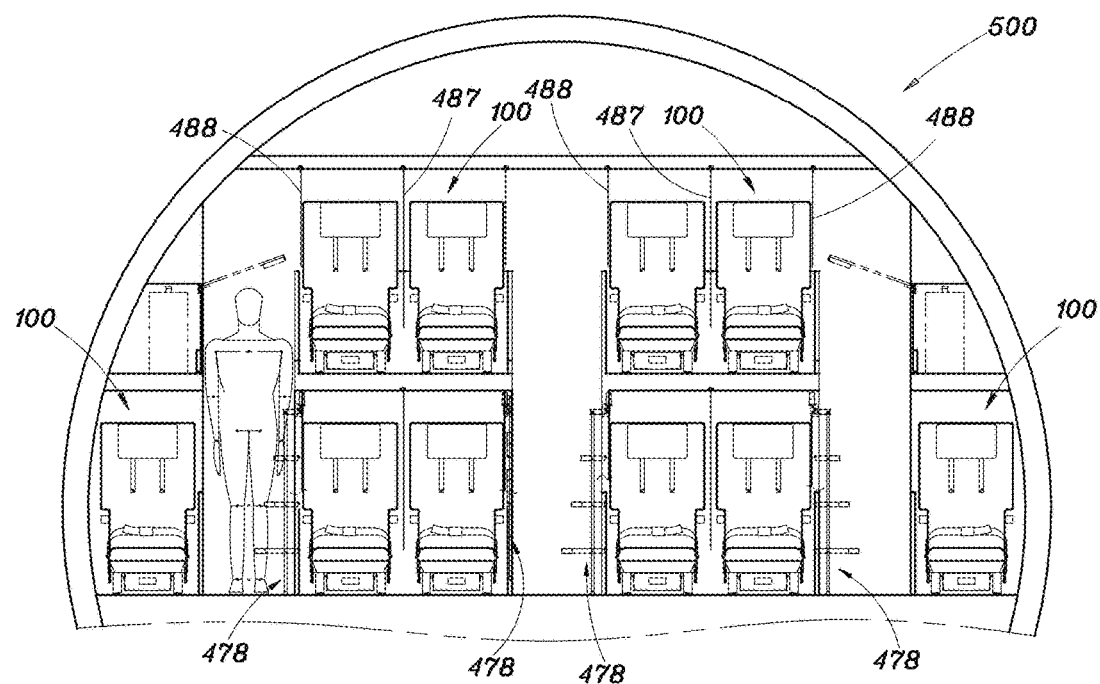
FIG. 52 is a partial cross-sectional front view of the airplane.

Pictorial view show on FIGS. 41, 47, and 52.

A main ladder assembly 478 disclosed in the previous patent comprises a ladder wall 473, a ladder assembly 470 and a power drive. The ladder wall 473 secures its bottom to the lower deck by the aisle and its top to the bottom of upper deck. The ladder assembly 470 mounts in the ladder wall 473 and comprises a pair of vertical footing bars 432 of alloys and four equally spaced ladder steps 434 positioned between the footing bars 432. Each ladder step 434 is a weldment containing a step 439 and a pair of ladder arms 440 mounted individually on the sides of step 439. The power drive mounts on the ladder wall 473 and comprises a motorized worm-gear 471 and a spring housing 472 with a torsion spring. The motorized worm-gear 471 has a long output shaft to engage with the torsion spring of the spring housing 472, which is located on the opposite side of the ladder assembly 470, and with the front of the ladder assembly facing the aisle, the shaft lock to the rear ends of the ladder arms 440 of the top ladder step 434. When the motorized worm-gear 471 rotates to extend the ladder assembly 430 out to become a ladder for climbing, the pair of footing bars 432 will stand on the floor to support loads and place ladder steps 434 in the horizontal position.

The ladder assembly 470 is the same as the manual ladder assembly 430 without the pair of actuating arms 438. Therefore, the detailed description of the power ladder assembly 470 presents in the manual ladder assembly 430 and pictorially shows in FIG. 42.

Figure 51:
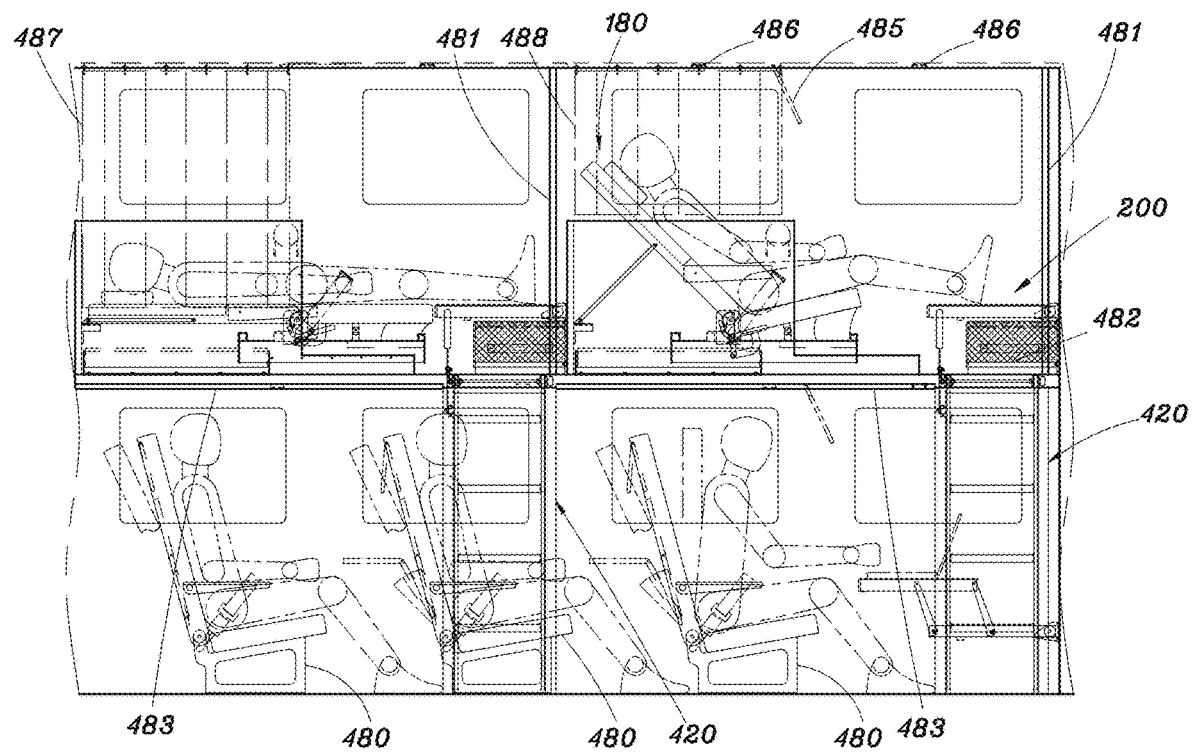
FIG. 51 is a cross-sectional side view of the bus with the reclining seats on the upper deck and the non-reclinable seats on the lower deck.

Safety Installation and Amenities:

Pictorial views show on FIGS. 40, 41, and 51.

For safety, a vertical handrail 481 mounts on the upper deck close to the front partition wall 202. A safety net 482 to hold varied sizes of carry-on luggage installs on the front partition wall 202 under each footrest 210. An impact cushion strip 483 mounts on the lower conner edge of the upper deck to minimize head injury to passengers sitting on the floor deck. A cup holder 484 mounts on the side panel of each seat. For entertainment, a video touchscreen 485 mounts in the ceiling with the screen facing downward and slightly recess from the ceiling and positioned in front of each seat 180 or 100. It has two arms extended to the rear, one on each side and the arms hinge their rear ends on the ceiling structure. The video touchscreen 485 has a ratchet lock to automatically lock it in the ceiling for storage, and by pressing the ratchet lock to unlock, it will pop up slightly, allowing manually to tilt down to any desired angles and hold in position by friction to be watched by the passenger at any sitting position. The headphones are located at the seat for the passenger to enjoy provided programs or play video games. Sockets for personal electronic devices should be provided. The ceiling of each seat mounts a reading light 486 in front of the seat and another above the footrest 210 at the table position. Window sunshades must install. A privacy curtain 487 may install between a pair of seats and an aisle curtain 488 by the aisle.

Non-Reclinable Seats:

Pictorial view shows on FIG. 51.

If there is any need to increase the vehicle capacity, it may provide two rows of non-reclinable seat 480 in each seating section of the lower deck. The seats are like economy-class seats in airplanes, but shorter in height, and on its back, each seat has a video touchscreen, a retractable table, and a storage pocket, all for the passenger sitting behind. Each seat can tilt slightly forward for the passenger behind the seat to easily get in and out, and backward for sitting comfort.

Seating in Trains:

Any passenger trains can have the same seating arrangement as the bus 400 shown on FIGS. 39 and 41, but it provides the power reclining seat 100 and power ladder 470. In each seating section, a wider train could have wider seats and a wider aisle, or four seats across instead of three seats.

Seating in Airplanes:

Pictorial views show on FIGS. 41 and 52.

The same basic concept of seating on the bus 400 shown on FIG. 39 may also apply to any big passenger airplanes. Some big airplanes 500 have a wide cabin width, allowing for two aisles. With seating configuration 1-2-2-1 on the lower deck and 0-2-2-0 on the upper deck, each power seat 100 has its own access to ensure good privacy. With the seats having the same width, 22 inches used in buses, it will have adequate aisle widths. The upper deck should have a thicker structure to install safety equipment like emergency oxygen masks. Therefore, each seating section will have ten seats instead of six seats on the conventional floor seating. It is a substantial increase in capacity. With the power ladders 470, the passengers can easily climb to the upper deck.

To further increase passenger capacity, the window seats could have non-reclinable seats 480. Since there is no ladder to block the entrance, the seat pitch can be much shorter than buses 400 to have more seats.

That concludes this disclosure. It is obvious that the seating concept is in many ways superior to most first-class seats in airplanes. Each first-class seat wastes too much floor space. A big video screen can only watch in the sitting position, a fixed table takes extra space, and fixed seat armrests are only comfortable in the sitting position. Some of the beds must be prepared. During sleeping time, if passengers want to eat, work, or watch video, they must manage to do that in an awkward sitting position on bed until the wakeup time, then the bed must fold back again to the sitting position. It requires so much labor, and passengers cannot fully enjoy it. On the other hand, the seating of this disclosure allows the passengers to do that entirely by themselves. They can set up their seats for either sitting, working, or sleeping anytime during the trips and watch video at any sitting position. They do all that in a very compact space. The labor savings from airline services and an increase in seat capacity should be able to make fares much more affordable, allowing more passengers to enjoy themselves even better on their journey.

While the invention has been described in complete detail and pictorially shown in the accompanying drawings, it is not limit to such details, since many changes and modifications may be made to the invention without departing from the spirit and scope thereof. Hence, it describes to cover all modifications and forms which may come within the language and scope of the appended claims.

The invention claimed is:

1. A passenger transportation vehicle has at least a walking aisle along its length, and a lower deck and an upper deck on both sides of each aisle to increase seating area, and each deck height is for sitting only to minimize an increase of a vehicle height, and some sections of the lower deck provide non-reclinable seats to increase the numbers of seats in the passenger transportation vehicle, and both decks are divided into seating sections, along the aisles, and each seating section is divided by the aisles into multiple cells on each of the upper and lower deck, and the seating cells with reclining seats are separated with vertical partition walls, and each seating cell contains one row of the reclining seats mounted on the horizontal deck close to the rear partition wall, facing forward, and each reclining seat contains a base frame supported by a pair of horizontally laid linear slides mounted on a footing frame anchored to the deck, a seatback supported by the base frame on a seatback hinge and connected to a stationary structure behind the reclining seat with a pair of tipping bars, enabling to slide on the linear slides when reclining, a cushion supported by the base frame on a cushion hinge, and a pair of links connecting both seatback and cushion to tilt the cushion at different paces when the seatback reclining to achieve sitting comfort and place the cushion horizontally to line up with the seatback when the seatback fully reclined, and the seatback of each reclining seat is power driven to recline on the seatback hinge, and a footrest assembly of each reclining seat separately mounted on the partition wall in front of the reclining seat, and the footrest assembly contains a footrest and places the footrest in a horizontal footrest position in the same elevation of the cushion of the reclining seat to enhance sitting comfort and to form a bed with both cushion and seatback of the reclining seat, and places the footrest to a higher elevation from the horizontal footrest position and positions close to the cushion to be used as a table, and places the footrest from the horizontal footrest position to a vertical position for storage, and each seating cell on the lower deck has a main ladder assembly, and the main ladder assembly comprises a ladder assembly, a ladder wall, and an electric drive device, and the ladder wall secures its bottom to a floor by the aisle and its top to the ceiling of the lower deck, and the ladder assembly mounts in the ladder wall, and said electric drive device mounts on the ladder wall, and said ladder assembly comprises a pair of vertical footing bars, and several equally spaced ladder steps positioned between the vertical footing bars, and each of the ladder steps has two arms, one on each side, and when the ladder steps is in a horizontal position to become a ladder standing on the floor and face an aisle for climbing, the arms individually hinge their rear ends on the ladder wall, and hinge on the pair of vertical footing bars to create a parallel linkage, and the pair of arms of the top ladder step is driven by the electric drive to rotate the ladder assembly to place the ladder assembly from a storage position to an extended position to become a ladder, permitting passengers to use the ladder to reach the seating cell on the upper deck.

2. The passenger transportation vehicle as recited in claim 1, wherein said footrest assembly further comprises a footrest support supporting said footrest, and the footrest support comprises a support frame and two pairs of lifting arms, and a footrest drive, and with the footrest in the horizontal footrest position and its front facing said cushion, a majority of the support frame on a front side has a longitudinal recess on an upper side, and the footrest is placed in the recess and supported by the support frame from below, and each pair of the lifting arms positions in a longitudinal gap between each side of the footrest and the support frame, with one lifting arm placed at the front side of the other in a vertical plane and both lifting arms hinge their front ends on the supporting frame and their rear ends on the footrest, and the footrest drive mounts on a rear end of the support frame and comprises an electric drive with a long output shaft and a spring housing containing a torsion spring, and the electric drive places on one side of the support frame and the spring housing on the other side, and the shaft of the electric drive engages with the torsion spring of the spring housing and locks to the support frame, permitting the footrest to be raised by the electric drive from the horizontal footrest position to the vertical storage position, and the torsion spring provides balancing torque, and said footrest comprises a footrest locking device, an upholstery, and a footrest frame, and the footrest frame contains a flanged channel bar laid longitudinally in a middle and mounted in a bottom, and the upholstery mounts on an outside of the flanged channel bar, and said footrest locking device mounts inside the flanged channel bar near the front side of the footrest frame, permitting the footrest to be locked on the support frame in the horizontal footrest position, and to be manually raised to the table position.

3. The passenger transportation vehicle as recited in claim 2, wherein said footrest locking device comprises a handle, a locking bar of square cross-section, a guiding block with a square hole and a front spring seat, a compression spring, a rear spring seat, a lock retainer, a torsion spring, and a hook, and with the footrest in the horizontal footrest position and its front side facing the reclining seat, said handle connects to a front end of said locking bar, and the locking bar slidably engages in the square hole of said guiding block mounted on the flanged channel bar, and said rear spring seat positions at a rear side of the guiding block and secures to the locking bar, and the compression spring rests its front end on a front spring seat of the guiding block and its rear end on the rear spring seat to force the handle to rest on the guiding block, and a rear end of the locking bar has an upper face to engage with said hook, and the hook hinges on the lock retainer below an engaging face of the locking bar and rests on the lock retainer in the locked position, and the torsion spring mounts on the hinge of the hook to hold the hook in an engaged position, and the lock retainer mounts on said support frame, and when manually pulling the handle forward, the locking rod will disengage with the hook, permitting the footrest to be manually raised from the horizontal footrest position to the table position, and by manually pushing the footrest back from the table position to the horizontal footrest position, the locking bar will push the hook away and place itself in the locked position, and then the hook rotates back to the engaged position.

4. The passenger transportation vehicle as recited in claim 1 further comprises a pair of armrests, one mounted on each side of said seatback, and each armrest has a releasing lever allowing the armrest to stop at various positions from sitting to bed and locks on both rotating directions at each position.

5. The passenger transportation vehicle as recited in claim 4 wherein said armrest comprises an armrest upholstery and an armrest assembly enclosed by said armrest upholstery, and the armrest assembly comprises a circular tooth disk, a locking bar, a guiding block with a square hole and a front spring seat, a rear spring seat, a channel bar, a compression spring, a connecting rod, and a releasing lever, and said circular tooth disk has locking teeth on its circular periphery to lock the armrest in both rotating directions and raised stops at both ends to automatically stop the armrest at the sitting position and bed position, and the circular tooth disk mounts laterally on the seatback, and said channel bar has its flanges pointing inward, and hinges its rear end concentrically on the circular tooth disk, and the locking bar has teeth at its rear end to engage with the circular tooth disk and slidably engages in the guiding block mounted on the channel bar, and the rear spring seat locks to the locking bar at a rear side of the guiding block, and the compression spring rests its rear end on the rear spring seat and its front end on the front spring seat of the guiding block to force the locking bar in an engaged position with the circular tooth disk, and the connecting rod hinges its rear end on a front end of the locking bar and its front end on the releasing lever positioned at a front end of the armrest, and the releasing lever hinges its top on a front end of the channel bar, and by pulling a bottom of the releasing lever forward, the locking bar will disengage with the circular tooth disk, permitting the armrest to be set to any desired positions.

6. A passenger transportation vehicle has at least a walking aisle along its length, and a lower deck and an upper deck on both sides of each aisle to increase seating area, and each deck height is for sitting only to minimize an increase of a vehicle height, and some sections of the lower deck provide non-reclinable seats to increase the numbers of seats in the passenger transportation vehicle, and both decks are divided into seating sections, along the aisles, and each seating section is divided by the aisles into multiple cells on each of the upper and lower deck, and the seating cells with reclining seats are separated with vertical partition walls, and each seating cell contains one row of the reclining seats mounted on the deck close to the rear partition wall, facing forward, and each reclining seat contains a base frame supported by a pair of horizontally laid linear slides mounted on a footing frame anchored to the deck, a seatback supported by the base frame on a seatback hinge and connected to a stationary structure behind the reclining seat with a pair of tipping bars, enabling to slide on the linear slides when reclining, a cushion supported by the base frame on a cushion hinge, and a pair of links connecting both seatback and cushion to tilt the cushion at different paces when the seatback reclining to achieve sitting comfort and place the cushion horizontally to line up with the seatback when the seatback fully reclined, and the seatback of each reclining seat can be manually reclined on the seatback hinge by releasing a seat locking device, and the footrest assembly of each reclining seat separately mounts on the partition wall in front of the reclining seat, and the footrest assembly contains a footrest and places the footrest in a horizontal footrest position in the same elevation of the cushion of the reclining seat to enhance sitting comfort and to form a bed with both cushion and seatback of the reclining seat, and places the footrest to a higher elevation from the horizontal footrest position and positions close to the cushion to be used as a table, and places the footrest from the horizontal footrest position to a vertical position for storage, and each seating cell on the lower deck has a main ladder assembly, and the main ladder assembly comprises a ladder support frame, a ladder assembly, and a handlebar assembly, and the ladder support frame secures its bottom to a floor by the aisle and its top to the upper deck and supports the ladder assembly, and the handlebar assembly mounts on the top of the ladder support frame and positions at one side of the ladder assembly, and can manually rotate the ladder assembly from a vertical storage position to an extended position to become a ladder, permitting passengers to use the ladder to reach the seating cell on the upper deck.

7. The passenger transportation vehicle as recited in claim 6, wherein said footrest assembly further comprises a footrest support supporting said footrest, and the footrest support comprises a support frame, two pairs of lifting arms, two spring housings, each with a torsion spring, and a shaft, and with the footrest in the horizontal footrest position and its front side facing said cushion, a majority of the support frame on a front side has a longitudinal recess on an upper side, and the footrest is placed in the recess and supported by the support frame from below, and each pair of the lifting arms positions in a longitudinal gap between each side of the footrest and the support frame, with one lifting arm placed at the front side of the other in a vertical plane and both lifting arms hinge their front ends on the support frame and their rear ends on the footrest, and said footrest comprises a footrest locking device, an upholstery and a footrest frame, and the footrest frame contains a flanged channel bar laid longitudinally in a middle and mounted in a bottom, and the upholstery mounts on an outside of the flanged channel bar, and the footrest locking device mounts inside the flanged channel bar near the front side of the footrest frame, permitting the footrest to be locked on the support frame in the horizontal footrest position, and to be manually raised to the table position.

8. The passenger transportation vehicle as recited in claim 7, wherein said footrest locking device comprises a handle, a locking bar of square cross-section, a guiding block with a square hole and a front spring seat, a compression spring, a rear spring seat, a lock retainer, a torsion spring, and a hook, and with the footrest in the horizontal footrest position and its front side facing the reclining seat, said handle connects to a front end of said locking bar, and the locking bar slidably engages in the square hole of said guiding block mounted on the flanged channel bar, and said rear spring seat positions at a rear side of the guiding block and secures to the locking bar, and said compression spring rests its front end on the front spring seat of the guiding block and its rear end on the rear spring seat to force the handle to rest on the guiding block, and a rear end of the locking bar has an upper face engaged with said hook, and the hook hinges on the lock retainer below an engaging face of the locking bar and rests on the lock retainer to hold in the locked position, and the torsion spring mounts on the hinge of the hook to hold the hook in an engaging position, and the lock retainer mounts on said support frame, and by manually pulling the handle forward, the locking rod will disengage with the hook, permitting the footrest to be raised to the table position, and by manually pushing the footrest back from the table position, the locking bar will push the hook away and place itself in the lock position, and then the hook will rotate back to the engaging position.

9. The passenger transportation vehicle as recited in claim 6, wherein said seatback locking device further comprises a circular sector, a locking handle, a tension spring, and a stub shaft with a torsion spring, and said circular sector has locking teeth on its periphery and mounts on one side of said seatback concentrically with said seatback hinge, and said locking handle has a teeth head at its rear end to engage with the teeth of said circular sector and its middle part hinges on said base frame and its front end is a handle for disengaging with said circular sector, enabling the seatback to recline, and said tension spring attaches one of its ends to said locking handle and the other end to said base frame to force the locking handle engaging with said circular sector to maintain the seatback in a fixed position, and said stub shaft mounts on the seatback at the opposite side of the circular sector, concentrically with the seatback hinge, and the torsion spring anchors one of its ends on an end of said stub shaft and an other end on the base frame to create balancing torques minimizing the efforts to recline the seatback.

10. The passenger transportation vehicle as recited in claim 6 further comprises a pair of armrests, one mounted on each side of said seatback, and each armrest has a releasing lever allowing the armrest to stop at various positions from sitting to bed and locks on both rotating directions at each position.

11. The passenger transportation vehicle as recited in claim 10 wherein said armrest comprises an armrest upholstery and an armrest assembly enclosed by said armrest upholstery, and the armrest assembly comprises a circular tooth disk, a locking bar, a guiding block with a square hole and a front spring seat, a rear spring seat, a channel bar, a compression spring, a connecting rod, and a releasing lever, and said circular tooth disk has locking teeth on its circular periphery to lock the armrest in both rotating directions and raised stops at both ends to automatically stop the armrest at the sitting position and bed position, and the circular tooth disk mounts laterally on the seatback, and said channel bar has its flanges pointing inward, and hinges its rear end concentrically on the circular tooth disk, and the locking bar has teeth at its rear end to engage with the circular tooth disk and slidably engages in the guiding block mounted on the channel bar, and the rear spring seat locks to the locking bar at a rear side of the guiding block, and the compression spring rests its rear end on the rear spring seat and its front end on the front spring seat of the guiding block to force the locking bar in an engaged position with the circular tooth disk, and the connecting rod hinges its rear end on a front end of the locking bar and its front end on the releasing lever positioned at a front end of the armrest, and the releasing lever hinges its top on a front end of the channel bar, and by pulling a bottom of the releasing lever forward, the locking bar will disengage with the circular tooth disk, permitting the armrest to be set to any desired positions.

12. The passenger transportation vehicle as cited in claim 6, wherein said ladder support frame is a weldment comprising a pair of vertical support columns, a top angle bar, a bottom angle bar, and a pair of gusset plates, each with shaft-supporting bushing, and the top angle bar mounts transversely on a top of the vertical support columns and secures on the upper deck, and the bottom angle bar mounts transversely on a bottom of the vertical support columns and secures the floor, and the pair of gusset plates mounts on the top angle bar, and said ladder assembly comprises a pair of vertical footing bars, several equally spaced ladder steps positioned between the vertical footing bars, and a pair of actuating arms, and each of the ladder steps has two arms, one on each side, and when the ladder steps is in the horizontal position becoming a ladder to stand on the floor and face an aisle for climbing, the arms individually hinge their rear ends on the vertical support columns, and hinge on the pair of vertical footing bars to create a parallel linkage, and the pair of actuating arms locates at the elevation of the gusset plates, and hinge their front ends on the vertical footing bars and lock their rear ends to a drive shaft supported by the pair of shaft-supporting bushings to have the same parallel motion with the ladder steps, and the drive shaft rotates to retract the ladder assembly from the ladder position to a vertical position for storage.

13. The passenger transportation vehicle as cited in claim 6, wherein said handlebar assembly comprises a handle, a lifting arm, a roller, a drive shaft, and a spring housing with a torsion spring, and said shaft is supported by a pair of shaft-supporting bushings of the ladder support, and said lifting arm locates at one end of the drive shaft and locks its lower end to the drive shaft and its upper end hinges said roller, and said handle lines up with the roller, and hinges its lower end on a rear side of the ladder support frame, and its middle part has a slot to rotatably engage with said roller and its upper end is a grip handle, and the hinge of the handle located below the drive shaft to reduce an operating angle of 90 degrees needed for tilting said ladder, and the spring housing locates on the other end of the drive shaft opposite to the handle and mounts on the shaft, and its spring locks to the drive shaft to provide a balancing force for operating the ladder.

\* \* \* \* \*